2 Sheets—Sheet 1.
J. F. GLIDDEN.
MACHINE FOR TWISTING AND SPOOLING BARBED FENCE-WIRE.
No. 187,126. Patented Feb. 6, 1877.
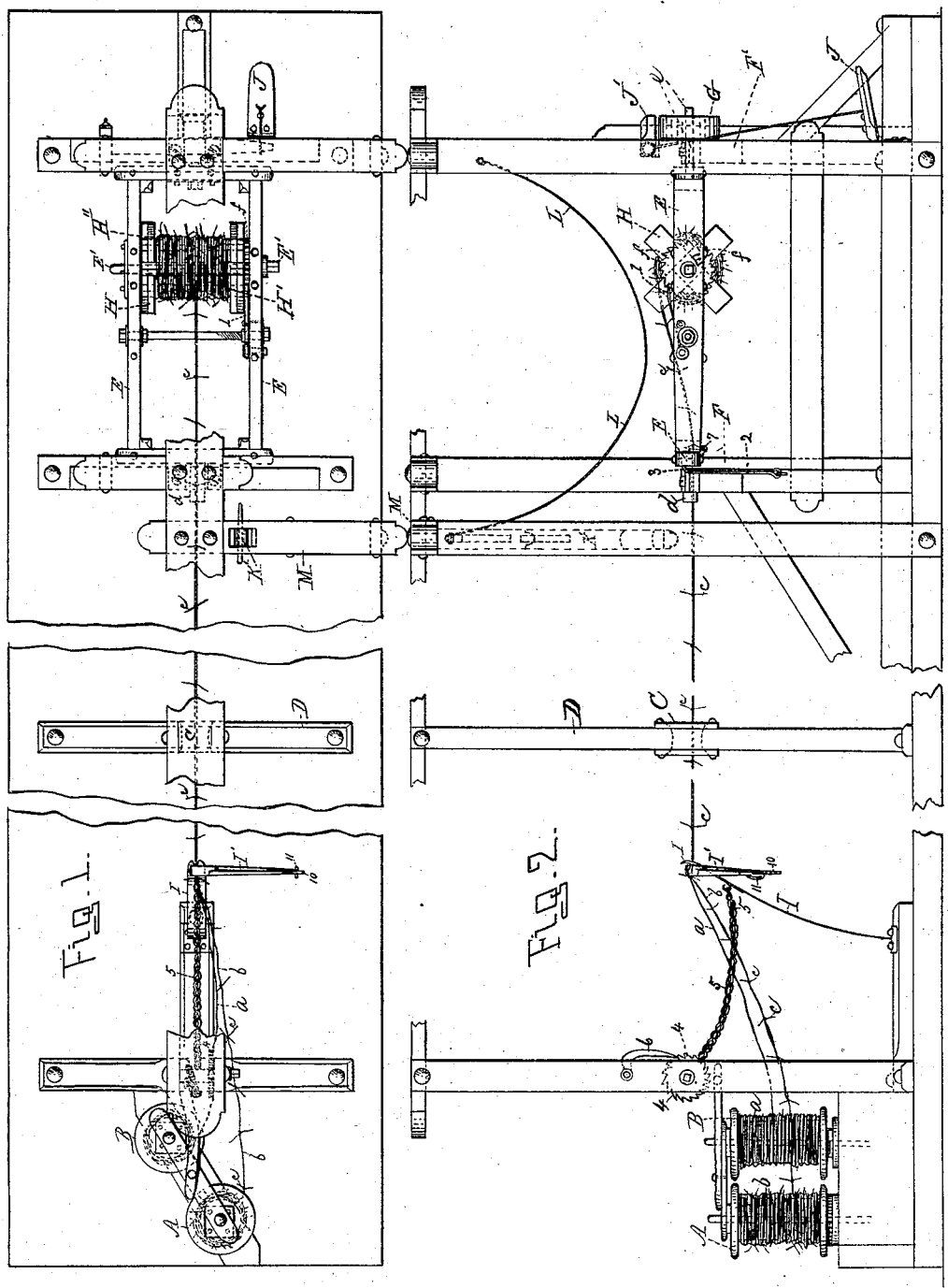
WITNESSES:
Edward C. Lott
C. E. Beaufort
INVENTOR:
Joseph F. Glidden 2 Sheets—Sheet 2.
J. F. GLIDDEN.
MACHINE FOR TWISTING AND SPOOLING BARBED FENCE-WIRE.
No. 187,126. Patented Feb. 6, 1877.
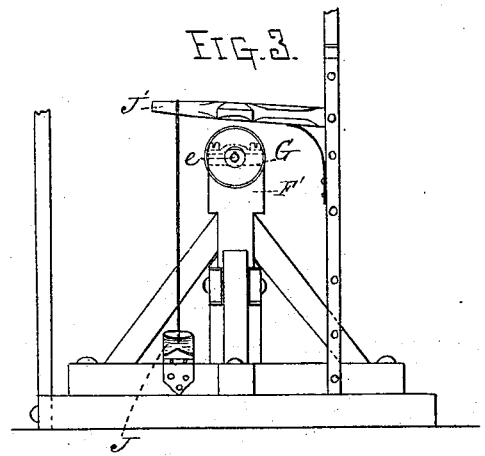
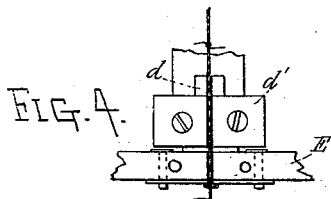
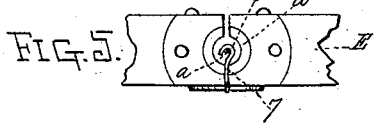
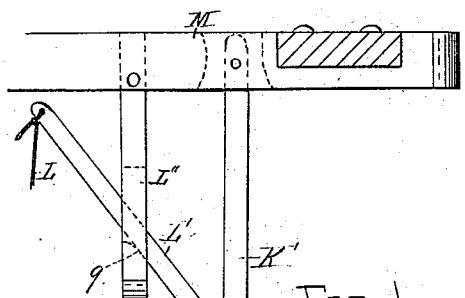
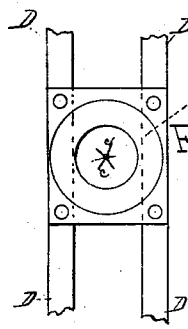
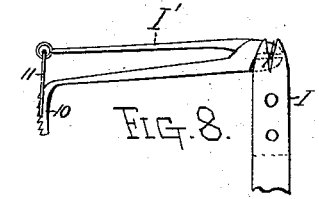
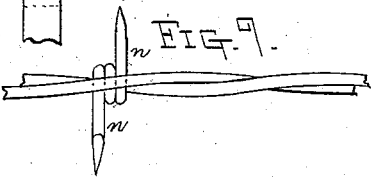
WITNESSES;
Edward C. Lott
L. E. Beaupré
INVENTOR;
Joseph F. Glidden.

UNITED STATES PATENT OFFICE.

JOSEPH F. GLIDDEN, OF DE KALB, ILLINOIS.

IMPROVEMENT IN MACHINES FOR TWISTING AND SPOOLING BARBED FENCE-WIRE.

Specification forming part of Letters Patent No. 187,126, dated February 6, 1877; application filed November 17, 1876.

*To all whom it may concern:*

Be it known that I, JOSEPH F. GLIDDEN, of De Kalb, in the county of De Kalb and State of Illinois, have invented certain new and useful Improvements in Machines for Twisting and Spooling Barbed Fence-Wire; and I do hereby declare that the following is a full, clear, and exact description of the same, reference being had to the accompanying drawings, forming a part of this specification, and in which—

Figure 1 represents a top or plan view of so much of my said machine as is necessary to illustrate my present invention. Fig. 2 represents a side view of the parts shown in Fig. 1. Fig. 3 represents an end view of a portion of the machine. Figs. 4, 5, 6, 7, and 8 represent, upon an enlarged scale, portions of the machine, as will be hereafter more fully described; and Fig. 9 represents, upon an enlarged scale, a section of the completed twisted or cable barbed wire.

To enable those skilled in the art to which my invention belongs to make and use the same, I will proceed to describe it more in detail.

In the drawings, A and B represent two spools filled with wire, $a$ $b$, wire $a$ being smooth, while wire $b$ is provided with barbs $c$, for which I have heretofore obtained Letters Patent. Wires $a$ $b$ are run through a long room, being passed through one or more guide-tubes, C, suitably supported upon posts D. Both strands are then passed through the rear journal $d$ of the twisting-frame E, said journal being made hollow for that purpose, and fitted to turn in a suitable bearing in the framing F. The front journal $e$ of twisting-frame E turns in a suitable bearing in the front framing F'. A rotating motion is imparted to twisting-frame E by means of a belt running upon a pulley secured to the end of journal $e$, or the motion may be imparted to it in any other suitable manner. The wire, after it has been twisted, is wound upon the spool H, and the operation of twisting and winding the wire is as follows:

The twisting-frame being arranged at one end of a long room or long walk, and the frame supporting the bobbin at the other end, the attendant takes hold of the ends of the wires $a$ and $b$, and draws them forward, passing them through one or more guide-rings, C, and then through the tubular journal $d$ of the twisting-frame E, after which he secures them both to the barrel of spool H, which has combined with it a ratchet-wheel, $f$, into which a pawl, 1, attached to the twisting-frame E, drops. The operator then secures the twisting-frame E in a horizontal position by means of a hook, 2, the hooked end 3 of which enters a hole in the end piece of twisting-frame E. The operator then places both wires in a V-slot in the top of spring-standard I, and clamps both wires by means of the clamp I' just back of the upper end of said spring-piece I, after which, by means of a crank on the end of ratchet-wheel 4, he draws back chain 5, which is attached to spring-piece I, and also to the journal of ratchet-wheel 4, thereby drawing back the upper end of spring-standard I until both strands of wire are properly stretched the whole distance between the twisting-frame and standard I, in which position the parts are held by means of pawl 6 taking into ratchet-wheel 4. Clamp I' may be supported upon a swinging frame, or movable frame, if preferred.

The operator now detaches hook 2 from twisting-frame E, and places hook 7 over the wires, said hook being attached to the inside of the rear end of frame E, as indicated in Fig. 5, for the purpose of preventing the wires from slipping out of the slots in the journal and bearing $d$ and $d'$ during the operation of twisting. A rotary motion is now imparted to twisting-frame E, and both strands of wire are twisted together; and after the wires have been sufficiently twisted the operator ships the twisting-belt, and, placing his foot upon treadle J, brings down friction-brake J' upon pulley G, upon the end of journal $e$, thereby stopping the twisting-frame E, when he replaces hook 2, removes clamp I', and detaches pawl 6. The twisted wire is now lifted out of the V-shaped standard I, and is also lifted out of tubular journal $d$, it being slotted, as well as its bearing $d'$, to permit of the removal of the twisted wire therefrom. The wire is then lifted up and passed through a slot, 8, in ring K in the lower end of a swing-arm, K', which can be operated by means of a rope or chain, L, attached to the rear end of arm L'. Spool H is now turned by means of a crank applied to the spindle E', which supports spool H, and while it is being turned to wind the twisted wire thereon the wire is gradually moved from end to end of the spool by means of cord L and swinging arms L' K'. After the twisted part of the wire has thus been wound upon spool H the wire is returned to the tubular bearing $d$, and the various devices again arranged for twisting another section of wire, and the operation is continued until the wire is all drawn from the spools A and B.

In Fig. 6 a front view is shown of the swinging arm K', the upper end of which is pivoted in a slot in the framing M, the slot being of sufficient length to allow swing-arm K' to be swung to the right of the position shown in Fig. 6, and the pivot of said swing-arm is so arranged that when the arm hangs perpendicular the guide-ring K will guide the twisted barbed wire to the end H' of the spool H, but the operator, by pulling upon the rope or cord L, can force swing-arm K' to the right of the position shown in Fig. 6 sufficiently far to guide the twisted barbed fence-wire to the other end H'' of the spool H, and when the operator slackens the rope L, swing-arm K', by its own gravity, will return, thus guiding the wire back over the barrel of the spool H, whereby the barbed wire can be wound uniformly upon its spool.

Arm L' passes through a long slot in a guide-piece, L'', which extends down from framing M, the lower end of the slot being inclined or beveled off, as indicated in dotted lines at 9, and this incline or beveled guides-arm L', when the upper end is depressed by rope L, so that swing-arm K' is easily thrown to the right of its position, shown in Fig. 6.

One handle of clamp I' is made with a ratchet end, 10, and the other handle has a link, 11, combined with it, whereby when the handles are compressed together to grasp the wires, as before explained, link 11 catches into the ratchet-teeth, as indicated in Fig. 8, thereby holding the jaws of the clamp firmly in position upon the wire.

In practice, the machine can be operated more economically by two attendants, at least one at each end of the machine, and it will be understood that spindle E', which supports spool H in frame E, may be so made that it can be readily removed for the removal of a full spool and the substitution of an empty spool.

In twisting a plain wire with a barb-wire, they are arranged relatively to each other before the twisting operation commences, so that the plain wire, when twisted with the barb-wire, will support and hold the barbs, as indicated in Fig. 9 of the drawings, the plain wire crossing the coil between the barbed ends diagonally, so that it bears upon the base of each projecting barb $n$, just outside of the main wire, about which the barbs are coiled.

By this arrangement the barbs are held very securely in position.

Having described my improvements in mechanism or machinery for twisting and spooling barbed fence-wire, what I claim therein as new and of my invention, and desire to secure by Letters Patent, is—

1. The combination, with twisting-frame E, of the slotted journal $d$ and $d'$, substantially as and for the purposes set forth.

2. The combination, with twisting-frame E, of ratchet-wheel $f$, pawl 1, and holding-hook 2, substantially as and for the purposes set forth.

3. The combination, with twisting-frame E and stationary frame F, of holding-hook 7, substantially as and for the purposes set forth.

4. The combination, with twisting-frame E and spool H, of swinging arm K', provided with a slotted ring, K, said parts being relatively arranged, substantially as and for the purposes set forth.

5. The combination, with spring-standard I, of wire-holding clamp I', substantially as and for the purposes set forth.

6. The combination, with the swinging arm K', provided with a slotted guide-ring, K, of arm L' and cord or rope L, substantially as and for the purposes set forth.

7. The combination, in a machine for twisting and spooling barbed fence-wire, of mechanism consisting of the slotted spring-standard I, clamp I', chain 5, ratchet-wheel 4, and pawl 6, for straining and holding the strands of the wire secure and taut at one end of the machine, and of mechanism consisting of the stationary frame F, twisting-frame E, slotted bearing and journal $d$ $d'$, spool H, spindle E', ratchet-wheel $f$, pawl 1, holding-hooks 2 and 7, and slotted swinging arm K' at the other end of the machine, for twisting and winding or spooling the same, substantially as described.

JOSEPH F. GLIDDEN.

Witnesses:
 EDWARD C. LOTT,
 C. E. BEAUPRE.